(12) United States Patent
Chen et al.

(10) Patent No.: US 8,065,132 B2
(45) Date of Patent: Nov. 22, 2011

(54) COMPUTER-IMPLEMENTED SYSTEMS AND METHODS FOR AUGMENTING STOCHASTIC EVENT SIMULATIONS FOR DESIGN OF EXPERIMENTS

(75) Inventors: Hong Chen, Cary, NC (US); Emily Lada, Raleigh, NC (US); Phillip C. Meanor, Cary, NC (US)

(73) Assignee: SAS Institute Inc., Cary, NC (US)

( * ) Notice: Subject to any disclaimer, the term of this patent is extended or adjusted under 35 U.S.C. 154(b) by 453 days.

(21) Appl. No.: 12/259,679

(22) Filed: Oct. 28, 2008

(65) Prior Publication Data
US 2009/0313003 A1    Dec. 17, 2009

Related U.S. Application Data

(60) Provisional application No. 61/060,990, filed on Jun. 12, 2008.

(51) Int. Cl.
*G06F 9/45* (2006.01)

(52) U.S. Cl. .......................................................... 703/22

(58) Field of Classification Search .................... 703/13, 703/22, 6, 10, 19, 16; 708/250; 717/124
See application file for complete search history.

(56) References Cited

U.S. PATENT DOCUMENTS

| | | | |
|---|---|---|---|
| 7,548,879 B2 * | 6/2009 | Cash et al. ....................... | 705/35 |
| 7,650,267 B1 * | 1/2010 | Sturrock et al. .................. | 703/6 |
| 2004/0193393 A1 * | 9/2004 | Keane ............................... | 703/16 |
| 2004/0199372 A1 | 10/2004 | Penn | |
| 2005/0222834 A1 | 10/2005 | Riley | |
| 2006/0129970 A1 | 6/2006 | Haas et al. | |

OTHER PUBLICATIONS

Michael A. Gray, "Discrete Event Simulation" IEEE, 2007, pp. 62-66.*
Gray, Michael A., "Discrete Event Simulation", IEEE, Computing in Science & Engineering, vol. 9, Issue 6, pp. 62-66 (Nov./Dec. 2007).
Running Simulations Repeatedly:: Using Statistics (SimEvents®), http://www.mathworks.com/acess/helpdesk/help/toolbox/simevents/ug/bp4wv3c.html (3 pp.).
Varying Simulation Results by Managing Seeds:: Using Statistics (SimEvents®), http://www.mathworks.com/access/helpdesk/help/toolbox/simevents/ ug/bp5eimf.html (3 pp.).
Banks, Jerry, "Getting Started with AutoMod", AutoSimulations, Inc., Aug. 2000 [512 pp.].
Anylogic User's Manual, XJ Technologies Company Ltd., www.xjteck.com, 1992-2005 [430 pp.].
Arena Basic User Guide, Rockwell Automation Technologies, Inc., Nov. 2007 [90 pp.].
ExtendSim Overview, http://www.extendsim.com/prods_overview.html [12 pp.], 2008.

* cited by examiner

*Primary Examiner* — Dwin M Craig
(74) *Attorney, Agent, or Firm* — Jones Day

(57) ABSTRACT

Computer-implemented systems and methods for executing stochastic discrete event simulations for a stochastic model through a design of experiments approach. Streams of random numbers are associated with stochastic model components that are sources of random variation within the stochastic model. A system is configured to manage the streams while the stochastic model is being executed during a simulation.

15 Claims, 22 Drawing Sheets

Fig. 5

| PointName | StartTime | EndTime | NumServers | Replicates | NumberCustomersServiced |
|---|---|---|---|---|---|
| point 1 | 0 | 1,000 | 1 | △2 | |
| point 2 | 0 | 1,000 | 2 | △2 | |

Fig. 6

| PointName | StartTime | EndTime | NumServers | Replicates | NumberCustomersServiced |
|---|---|---|---|---|---|
| point 1 | 0 | 1,000 | 1 | ▽2 | 942 |
| | | | | 1 | 966 |
| point 2 | 0 | 1,000 | 2 | ▽2 | 918 |
| | | | | 1 | 1,017.5 |
| | | | | | 1,037 |
| | | | | 2 | 998 |

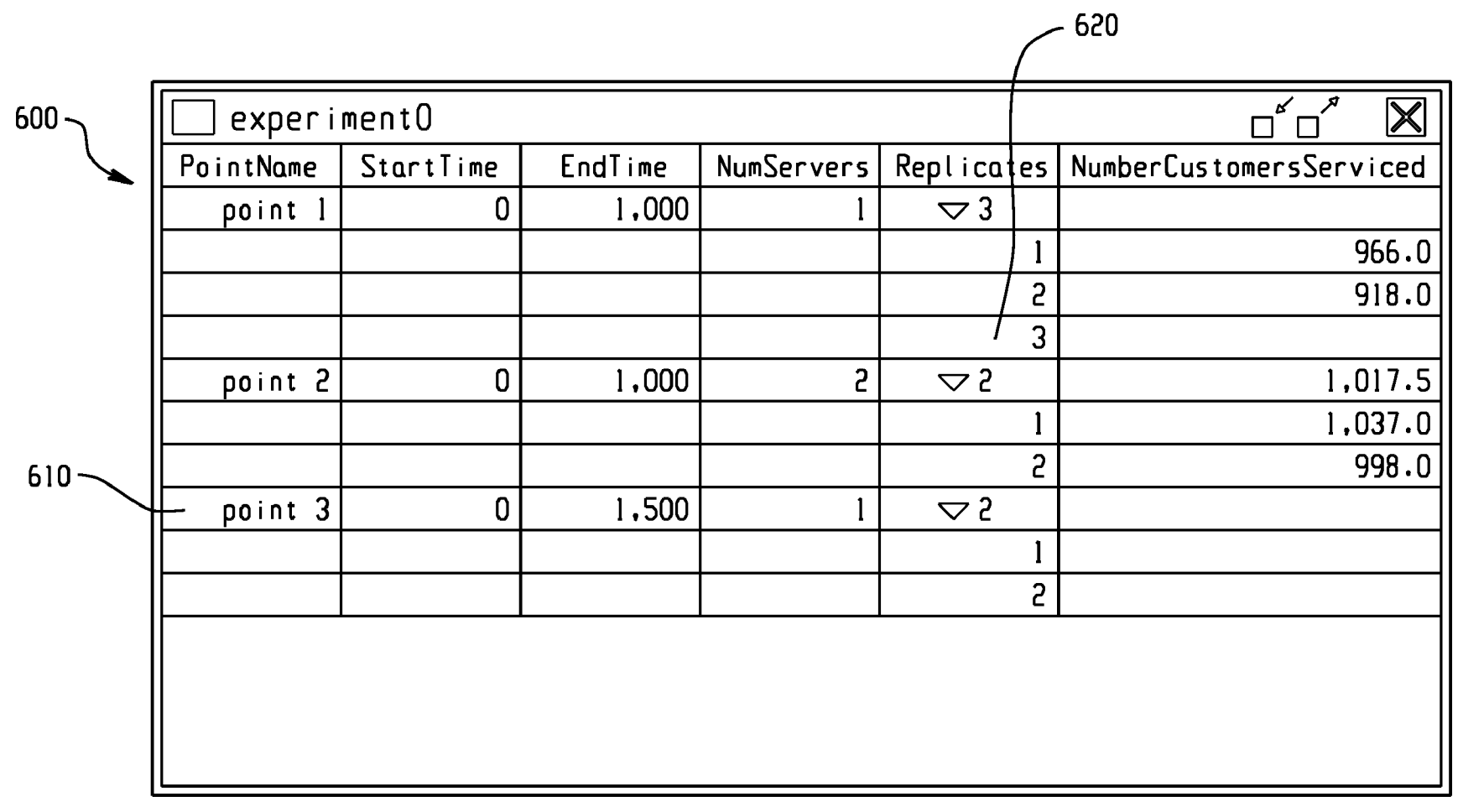

| ☐ experiment0 | | | | | ☒ |
|---|---|---|---|---|---|
| PointName | StartTime | EndTime | NumServers | Replicates | NumberCustomersServiced |
| point 1 | 0 | 1,000 | 1 | ▷ 3 | |
| | | | | 1 | 966.0 |
| | | | | 2 | 918.0 |
| | | | | 3 | 1,017.5 |
| point 2 | 0 | 1,000 | 2 | ▷ 2 | |
| | | | | 1 | 1,037.0 |
| | | | | 2 | 998.0 |
| point 3 | 0 | 1,500 | 1 | ▷ 2 | |
| | | | | 1 | |
| | | | | 2 | |

*Fig. 7*

| ☐ experiment0 | | | | | | | | | | | | ☒ |
|---|---|---|---|---|---|---|---|---|---|---|---|---|
| PointName | StartTime | EndTime | NumQC | NumRep... | NumServ... | Replicates | NumFixed | AvgUtilQC | AvgWaitQC | AvgUtilRep... | AvgWaitServ... | AvgUtilServ... | AvgWaitRep... |
| point 1 | 0 | 2,700 | 1 | 1 | 3 | △5 | 55.8 | 98.117 | 640.598 | 32.901 | 0.114 | 22.777 | 1.682 |
| point 2 | 0 | 2,700 | 3 | 2 | 1 | △5 | 105.6 | 61.846 | 3.659 | 16.395 | 16.765 | 67.899 | 0 |
| point 3 | 0 | 2,700 | 2 | 3 | 1 | △5 | 100.2 | 88.317 | 84.874 | 10.93 | 16.765 | 67.899 | 0 |
| point 4 | 0 | 2,700 | 2 | 1 | 3 | ▽5 | 100.6 | 88.508 | 97.37 | 32.901 | 0.114 | 22.777 | 1.682 |
| | | | | | | 1 | 110 | 97.535 | 84.371 | 35.83 | 0.023 | 22.105 | 1.389 |
| | | | | | | 2 | 98 | 86.191 | 21.891 | 29.272 | 0.029 | 21.946 | 1.253 |
| | | | | | | 3 | 94 | 82.413 | 47.808 | 31.828 | 0.079 | 19.992 | 1.557 |
| | | | | | | 4 | 93 | 82.178 | 23.499 | 29.027 | 0.116 | 21.037 | 1.68 |
| | | | | | | 5 | 108 | 94.224 | 309.22 | 38.549 | 0.326 | 28.806 | 2.529 |
| point 5 | 0 | 2,700 | 2 | 1 | 1 | △5 | 100.2 | 88.317 | 84.641 | 32.79 | 16.765 | 67.899 | 0.234 |
| point 6 | 0 | 2,700 | 3 | 1 | 2 | △5 | 105.8 | 61.918 | 8.7 | 32.901 | 0.837 | 34.135 | 1.382 |
| point 7 | 0 | 2,700 | 2 | 2 | 2 | △5 | 100.4 | 88.472 | 97.977 | 16.473 | 0.837 | 34.135 | 0.021 |
| point 8 | 0 | 2,700 | 2 | 2 | 3 | △5 | 100.6 | 88.515 | 98.456 | 16.468 | 0.114 | 22.777 | 0.095 |
| point 9 | 0 | 2,700 | 1 | 1 | 1 | △5 | 55.8 | 98.117 | 621.012 | 32.79 | 16.765 | 67.899 | 0.234 |
| point 10 | 0 | 2,700 | 3 | 3 | 3 | △5 | 105.8 | 61.941 | 9.329 | 10.978 | 0.837 | 34.135 | 0.001 |
| point 11 | 0 | 2,700 | 1 | 3 | 2 | △5 | 55.8 | 98.117 | 641.409 | 10.982 | 0.114 | 22.777 | 0 |
| point 12 | 0 | 2,700 | 1 | 2 | 1 | △5 | 55.8 | 98.117 | 621.193 | 16.395 | 16.765 | 67.899 | 0 |

*Fig. 17*

COMPUTER-IMPLEMENTED SYSTEMS AND METHODS FOR AUGMENTING STOCHASTIC EVENT SIMULATIONS FOR DESIGN OF EXPERIMENTS

CROSS-REFERENCE TO RELATED APPLICATION

This application claims priority to and the benefit of U.S. Application Ser. No. 61/060,990, (entitled "Computer-Implemented Systems And Methods For Executing Stochastic Event Simulations For Design Of Experiments" and filed on Jun. 12, 2008), of which the entire disclosure (including any and all figures) is incorporated herein by reference.

TECHNICAL FIELD

This document relates generally to computer-implemented simulation environments and more particularly to computer-implemented stochastic discrete event simulations for design of experiments.

BACKGROUND

Discrete event simulation is used to model, study, plan, and improve systems in which random events play a dominant role. These systems are often driven by complicated mathematical and logical relationships, making it difficult to derive an analytical solution. Simulation involves the process of building a model that mimics the behavior of a real-world system of interest.

Often, by using statistical analysis and related methods, it is possible to uncover logical and mathematical relationships among elements of a system. Moreover, many real-world systems include not only complex mathematical and logical relationships but also significant random components. For such systems an analytical model, even a simple one, might not be possible. A far better approach is to incorporate the random elements of the system in the model. Discrete event simulation is one such modeling technique.

A prime motivation for building and running a discrete event simulation model is the creation of realistic data on the performance of the system being modeled, with an overall goal of using the data to make statistically valid inferences about the performance of the system. Discrete event simulation offers the opportunity to generate such data without the need to create and observe the system in the real world. This is an attractive alternative in many cases. For example, building several possible versions of the real-world system might be impossible, impractical, or cost-prohibitive. In extreme cases (as in major construction), it might be true that no real version of the system exists. Some versions of the system might provide such poor service (as in medical settings) as to create unacceptable legal liabilities. In these and many other cases, discrete event simulation is clearly preferable to other approaches (e.g., direct observation).

SUMMARY

In accordance with the teachings provided herein, systems and methods for operation upon data processing devices are provided for executing stochastic discrete event simulations for a stochastic model through a design of experiments. Streams of random numbers are associated with stochastic model components that are sources of random variation within the stochastic model. A system and method are configured to manage the streams while the stochastic model is being executed during a simulation.

As another example, a system and method can be configured for executing stochastic discrete event simulations for a stochastic model through a design of experiments approach, wherein streams of random numbers that are generated by a random number generator are associated with stochastic model components that are sources of random variation within the stochastic model. A design of experiments is associated with a plurality of design points including a first design point, and the first design point is associated with a plurality of replicates. A computer-readable data store is provided for storing information about the streams including information about a first stream. The first stream is associated with a first stochastic model component that is a source of random variation within the stochastic model, and the first stream has a plurality of substreams. Each of the substreams of the first stream are associated with a particular replicate of the first design point. Stream managing software instructions operate on a data processor for advancing to one or more different substreams based upon which of the replicates is to be used in the simulation of the stochastic model.

As yet another example, a system and method can be configured for executing stochastic discrete event simulations for a stochastic model through a design of experiments approach, wherein streams of random numbers that are generated by a random number generator are associated with stochastic model components that are sources of random variation within the stochastic model. A design of experiments is associated with a plurality of design points, wherein one or more of the design points are associated with a plurality of replicates. Substreams of the streams are associated with the replicates. The design points are stepped through one design point at a time and one replicate at a time. Each time a new design point is encountered during said stepping though the design points: the random number generator is reset and the stochastic model components are initialized with respect to the substreams that are associated with a replicate in the new design point. If response values are invalid (e.g., missing) for a replicate in the new design point, then the stochastic model is executed, and execution results are stored in a computer-readable data store. If response values are not invalid for a replicate in the new design point, then there is an advancing to a different substream that is associated with the next replicate of the new design point.

BRIEF DESCRIPTION OF THE DRAWINGS

FIG. 5 is a screen shot showing an experimental design for use with the model of FIG. 4.

FIG. 6 is a screen shot showing results associated with running an experiment.

FIG. 7 is a screen shot depicting a possible augmented design for the experiment shown in FIG. 6.

FIG. 17 is a screen shot of an experiment window for a repair shop model.

DETAILED DESCRIPTION

Figure 1:
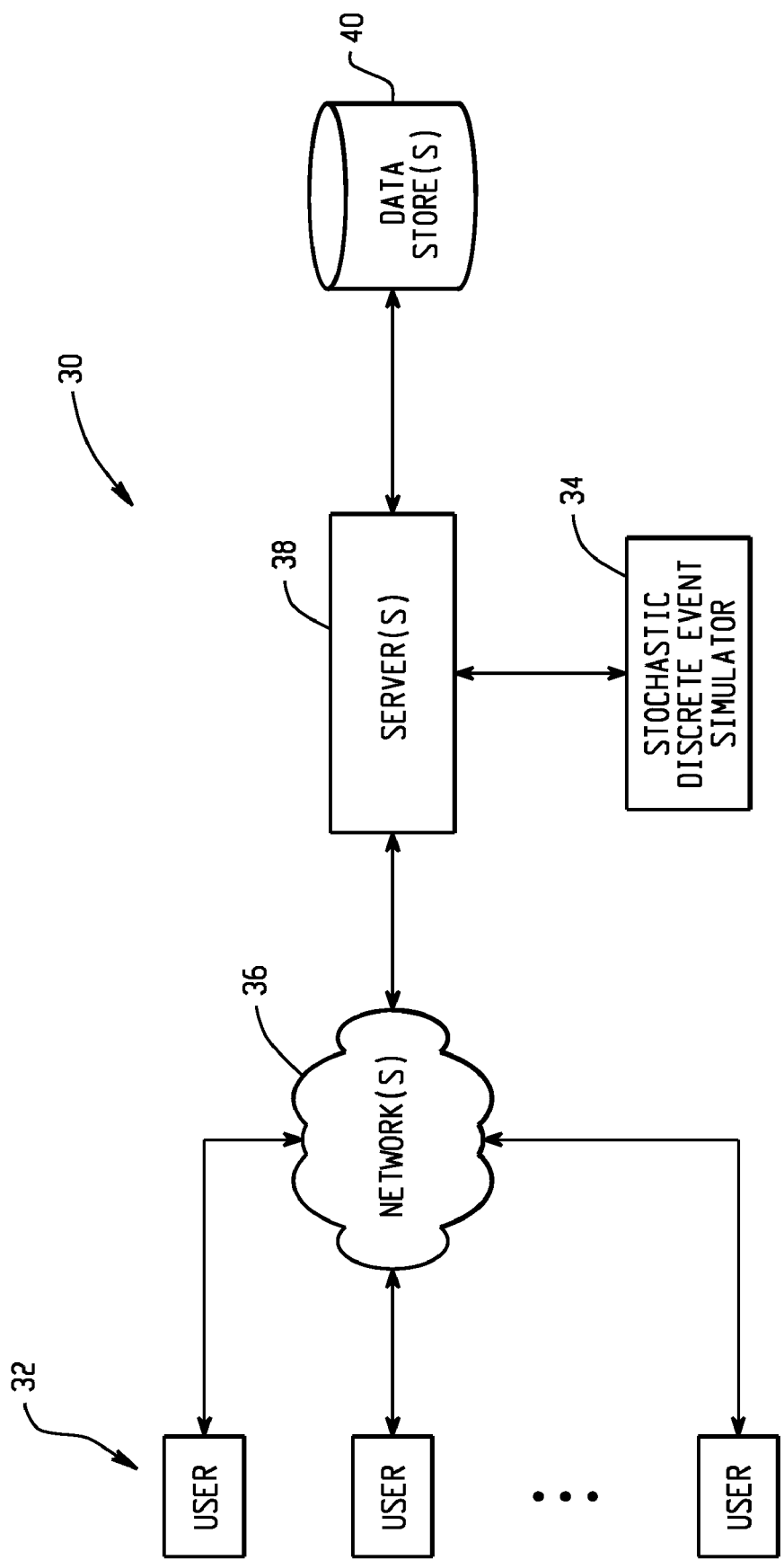
FIG. 1 is a block diagram depicting an environment wherein users can interact with a stochastic discrete event simulator.

FIG. 1 depicts at 30 an environment wherein users 32 can interact with a stochastic discrete event simulator 34 to analyze stochastic models of systems under investigation. Such systems to be analyzed can be of many different types, such as automotive assembly line processes, power consumption processes, financial and banking transactional systems, etc. To model the stochastic (random) aspects of such systems, stochastic components are included in a simulation model. Despite the presence of stochastic components in the model, the simulator 34 is configured to ensure that reproducible model results will occur when the model is executed multiple times using the same parameters.

Figure 2:
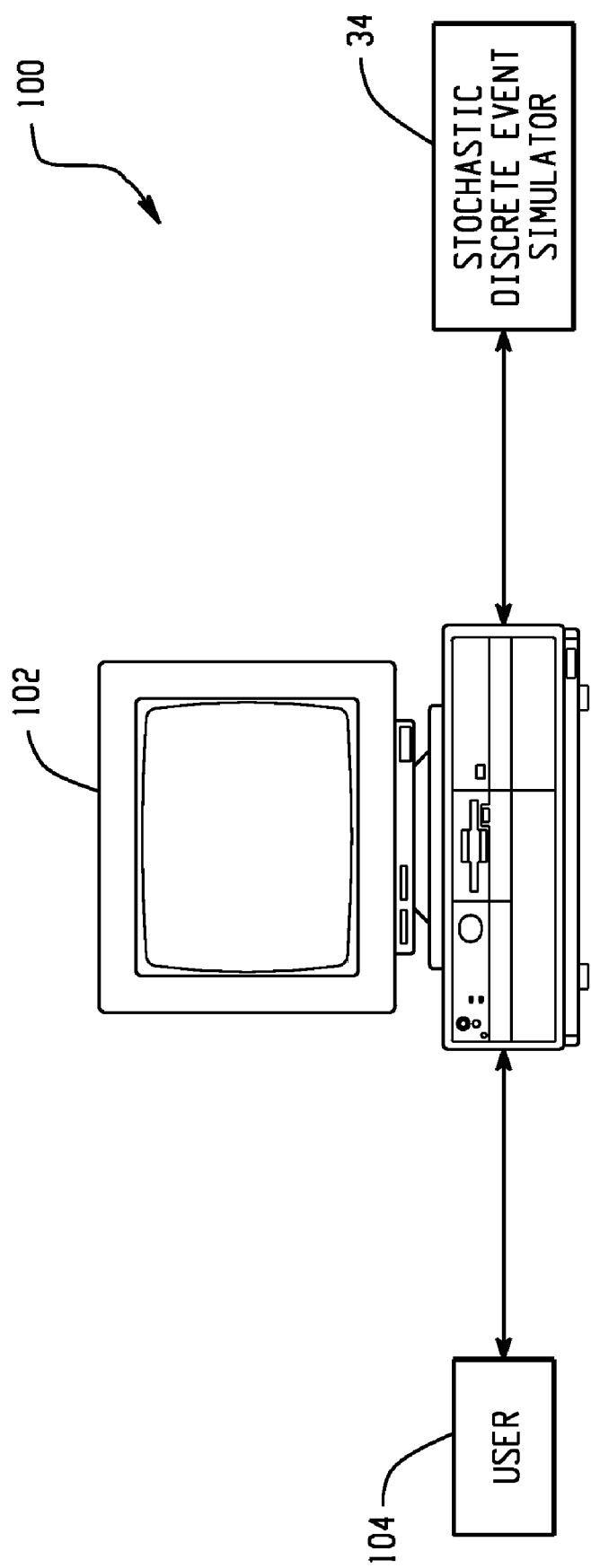
FIG. 2 is a block diagram depicting a single general purpose computer environment wherein a user can interact with a stochastic discrete event simulator.

The users 32 can interact with the simulator 34 through a number of ways, such as over one or more networks 36. Server(s) 38 accessible through the network(s) 36 can host the simulator 34. One or more data stores 40 can store the data to be analyzed by the simulator 34 as well as any intermediate or final data generated by the simulator 34. It should be understood that the simulator 34 could also be provided on other types of computer architectures, such as a stand-alone computer 102 for access by a user 104 as shown in FIG. 2 at 100.

Figure 3:
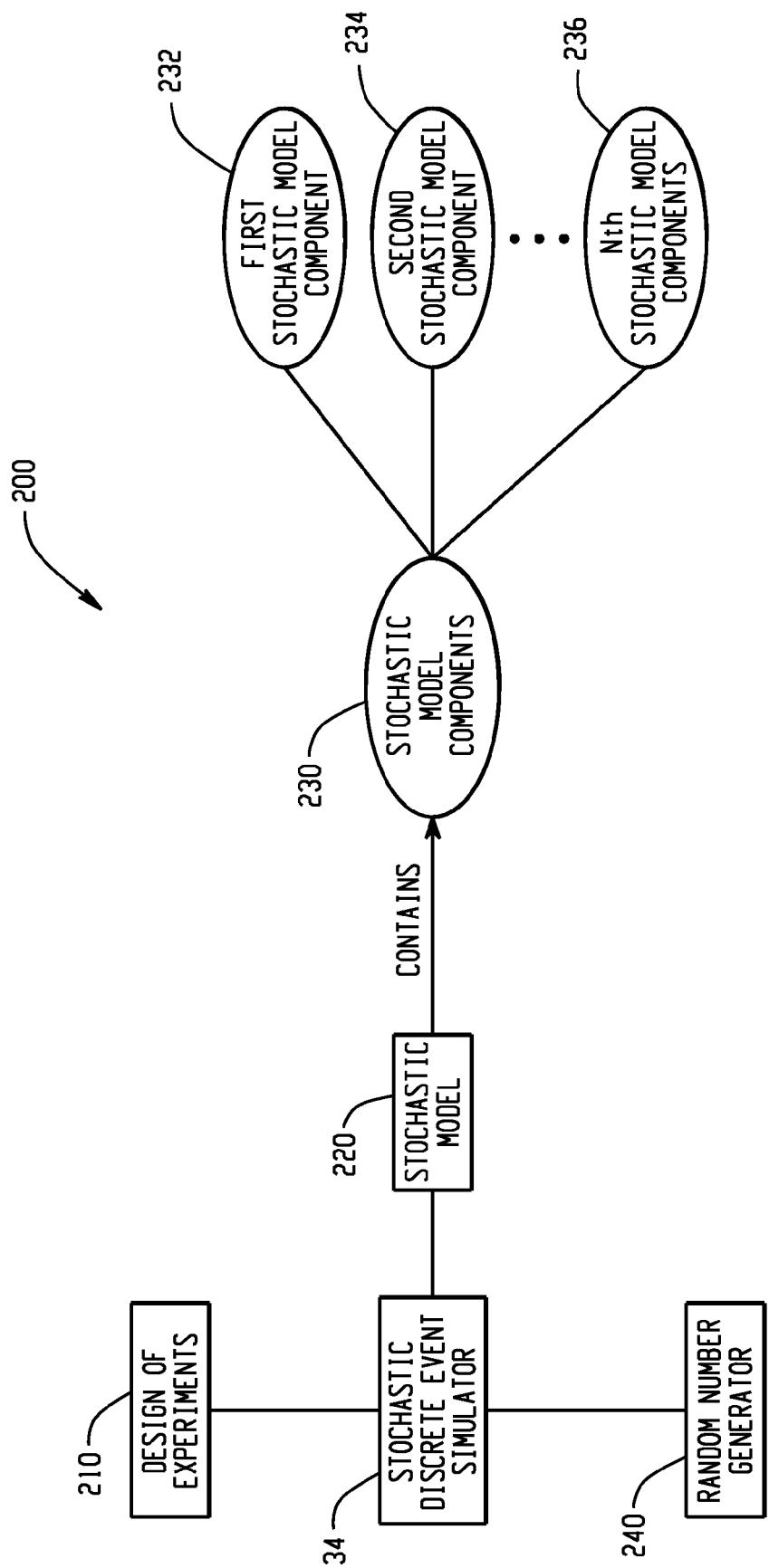
FIG. 3 is a block diagram depicting a model having stochastic model components.

The simulator's stochastic model is usually constructed from a collection of pre-defined, abstract components and are connected in a manner reflecting the nature of the system of interest. Some of these components have well-defined, editable parameters while other components might be used to collect and/or display data while the model is executing. For example in a banking transaction process (wherein banking customers are handled by bank tellers or servers), the number of bank tellers can be a parameter whose value can be edited by a user. As another example and as shown in FIG. 3, values can be generated for the stochastic components 230 of a stochastic model 220. This allows the stochastic model components 230 (e.g., first stochastic model component 232, second stochastic model component 234, and additional stochastic model component(s) 236) to represent the sources of random variation within the model 220, such as the arrival of customers at a bank. Within the simulation environment, a random number generator 240 generates random numbers for the stochastic model components 230 in order to simulate such random variations within the system.

After a user is confident that the simulation model 220 accurately reflects the system under investigation, a design of experiments approach 210 is used to provide an effective and efficient method for studying the effects of changes in selected control settings on the performance of the model 220. The structured investigation method provided by an experimental design (or, equivalently, design of experiments) helps to accomplish this. For example, the model 220 can be executed multiple times using different model parameter settings for each run. This set of multiple runs may be collectively referred to as an experiment. A simulation model can be executed multiple times using the same parameter settings and then averaging the results over those runs.

Figure 4:
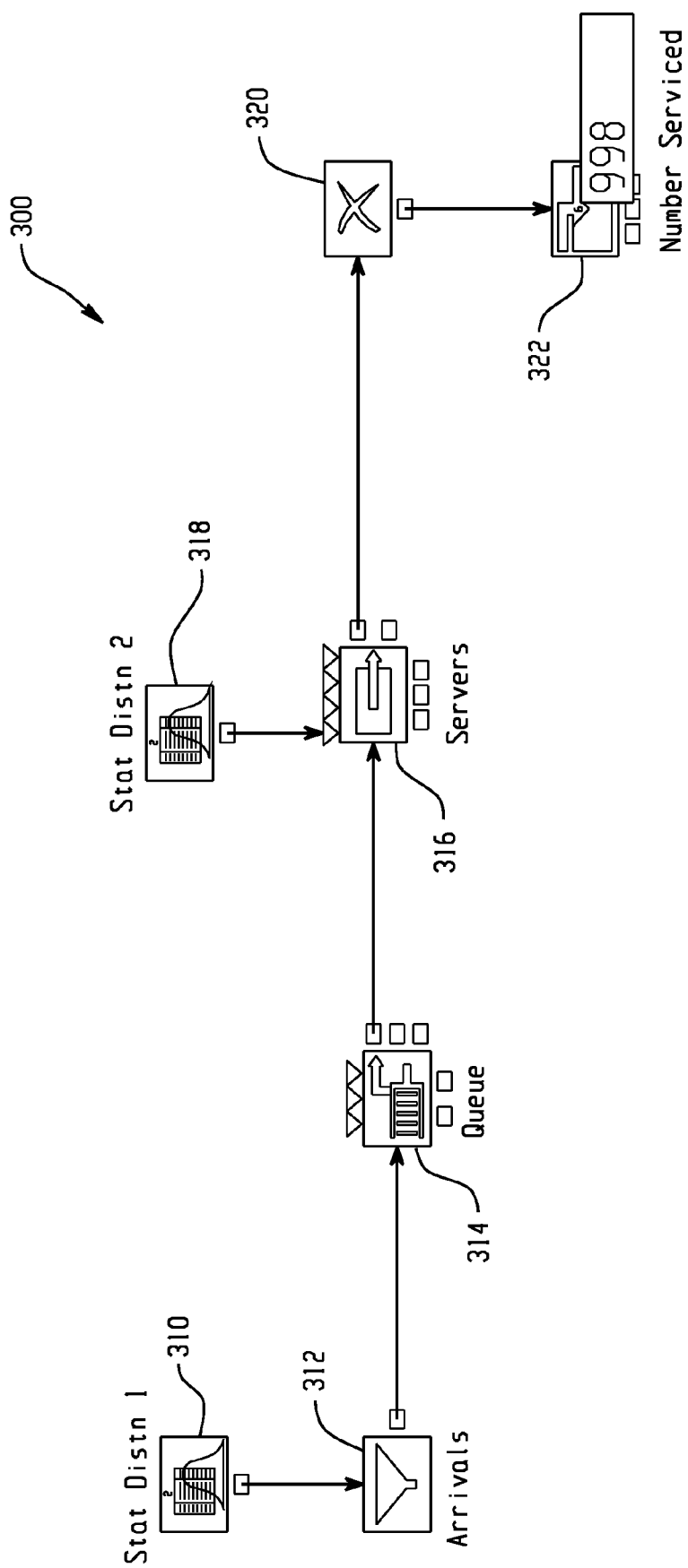
FIG. 4 depicts a queuing simulation model.

As further illustration of the stochastic nature of a stochastic model 220 (as embodied through its stochastic model components 230), FIG. 4 depicts at 300 a queuing simulation model. The model 300 represents customers being served at a bank. Customers arrive at the bank (Arrivals component 312), wait in a single line (Queue component 314) to be served by the next available teller (Servers component 316), and then exit the bank (exit component 320). At some specified rate (component 310), customers arrive and are serviced at some specified rate (component 318) and then leave (component 322 which represents how many customers were serviced). In this model, components 310 and 318 are stochastic model components that are sources of random variation within the model. For example, the stochastic model component 310 labeled Stat Distn 1 contains a probability distribution from which the customer interarrival times are sampled. That is, after a customer arrives at the bank the Arrivals component 312 will ask the Stat Distn 1 component 310 how long it needs to wait until the next customer arrives. Examples of common probability distributions include the exponential distribution, uniform distribution, normal distribution, and beta distribution.

After a simulation model has been developed and validated, it can be used to investigate how the system might perform under different conditions. This is accomplished by setting or initializing various system parameters and/or component parameters in the model, executing the model, and then analyzing any recorded data or measurements. It is not uncommon to evaluate a given model under a wide variety of system and component parameter settings. As an example, for the model 300 in FIG. 4, a user might be interested in studying how the following modifications would affect customer throughput at the bank:

1. Change the operating hours for the bank by modifying the simulation run length.
2. Change the number of tellers (servers), perhaps adding more tellers during the most busy times of the day.
3. Change the arrival rate of the customers.
4. Change the service rate of the customers.

It is noted that most simulation models are typically much more complicated and detailed than this example. As an illustration, models can contain hundreds of components and the user might be interested in performing hundreds of model executions. This involves adjusting and initializing many system or component parameter settings for the hundreds of components.

As discussed above, a stochastic model can be used within a design of experiment context by having the model undergo multiple model runs or executions wherein each run uses a different combination of system and/or component parameter settings. In design of experiments terminology, the component or system parameters being initialized in an experiment are called factors, and the values that are being collected or measured are referred to as responses. An individual combination of settings in an experimental design is sometimes referred to as a design point in the experiment. Due to the stochastic nature of simulation models, it is helpful to execute each design point in a simulation experiment multiple times. Each run of the same design point is called a replicate of that design point. In other words, a given set of model parameter settings can be referred to as a design point in an experiment and each model execution using that set of parameters can be referred to as a replicate of that design point. FIG. 5 shows at 400 an experimental design for use with the previously described model.

The experiment in FIG. 5 contains two design points (402 and 404), each with two replications (as shown at 410) and a simulation run length of 1,000 time units (EndTime—StartTime). StartTime, EndTime, and Number of Servers columns are shown respectively at 420, 422, and 424. For all runs of the model, the value of the response named NumberCustomersServiced will be recorded in column 430. In this example, the only model initialization difference between the two design points is that for the design point labeled point 1 the NumServers factor will be set to the value 1, and in the second design point this factor value will be initialized to the value 2.

FIG. 6 shows at 500 the results associated with running this experiment. In display 500, the NumberCustomersServiced value (as shown at 510) is recorded for each replication run and then the replicate response values are averaged for each design point. For example, the first replicate for the first design point has a replicate response value of 966, and the second replicate for the first design point has a replicate response value of 918. The average of these two replicate response values is 942 as shown at 520.

For the second design point (with the number of servers being set at "2"), the first replicate for the second design point has a replicate response value of 1037, and the second replicate for the second design point has a replicate response value of 998. The average of these two replicate response values is 1,017.5 as shown at 530. The overall higher response value of the second design point reflects the effect of adding an additional server to the banking transaction process.

In this example, the bank queuing model includes stochastic model components that are the source of random variation within the model. To generate the random variation for a stochastic model component, many different types of algorithms can be used, such as those that have been developed to use pseudo-random numbers to generate samples from various probability distributions. In these algorithms, a pseudo-random number is a sample from the uniform distribution on the interval [0,1].

Random number generators can create a series of pseudo-random numbers with a period of length greater than 2190. That is, the pattern with which the numbers are generated will not repeat until after 2190 random numbers have been generated. This period is so long that the entire random number series can be logically decomposed into a set of streams, each with a long period. Each stream is further divided into substreams, which are used when running multiple replications of the model.

With respect to these streams, the simulator is configured so that different streams are used in the computer simulation environment for each source of randomness in the model. That is, each component in the model that requires a sample from a probability distribution will automatically use a different stream. Furthermore, each replication of a design point in an experiment increments the substream for each assigned stream so that a different substream is used for each replication. Each design point, however, starts each stream at the same substream so that if two design points in an experiment are identical (all factors and parameters are set to the same values), then the simulation results for those two design points will be identical.

In this way, each time an experiment (with all its design points and replicates) is run it produces the same results. No matter what order the design points in a given experiment are run, the results associated with a particular design point should be the same. Accordingly, the simulator provides the capability that the streams associated with the probability distributions used in the various components in the model are assigned and initialized in a well-defined manner. As an illustration of where such a capability can be used, consider the situation where an original experimental design proves insufficient and the experiment needs to be extended or augmented. This experimental design augmentation might be accomplished by editing the experiment and adding replicates or design points. It is also possible that a statistical analysis of the simulation results will indicate that additional runs need to be made and the suggested runs will be automatically added to the experiment window. FIG. 7 depicts at 600 a possible augmented design for the experiment previously shown in FIG. 6.

In FIG. 7, a new design point (point 3) has been added at 610 to the experiment along with an additional replicate at 620 for the design point labeled point 1. The simulator identifies what replicates need to be run to complete the experimental design, while avoiding the time consuming process of rerunning the previously completed runs. The simulator is also configured in this example to ensure that, if the entire experiment is rerun, the results for each of the replications of a design point will be reproducible. One way to accomplish this is for the simulator to include stream management operations such that the same substreams will be assigned to the same probability distributions for each execution of the experiment, even if additional replications or design points are added. In other words, the stream management operations achieve reproducibility through a well-defined assignment of random streams (or substreams) to the stochastic components of the simulation model. For example, after a computer simulation experiment is executed it is not uncommon to find the need for additional replications of a given design point in the experiment or even the need for new design points. With stream management operations, the simulator allows the entire experimental design to be rerun so that the results match previous model executions no matter how the experimental design is modified, and eliminates the requirement to re-execute those portions which have not changed from previously performed replication runs.

Figure 8:
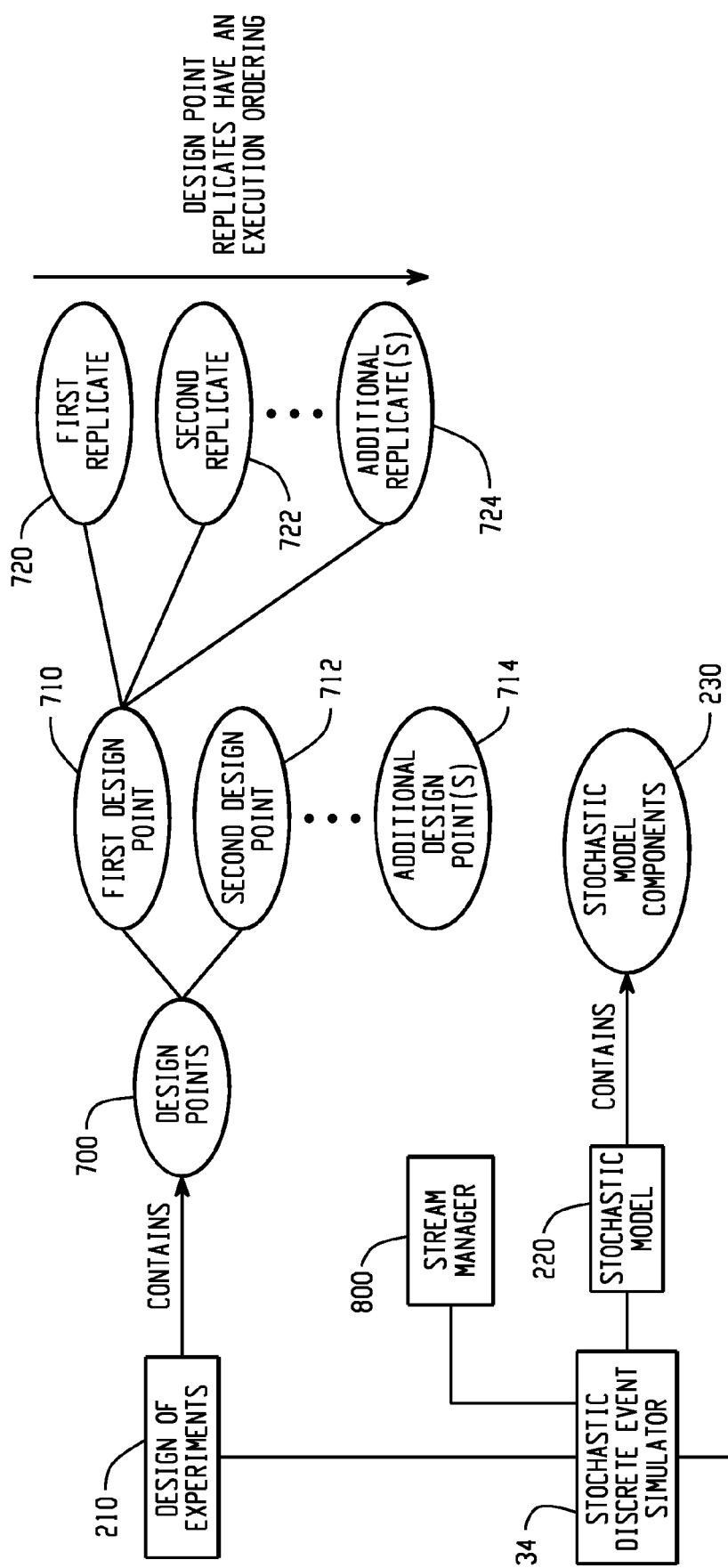
FIGS. 8-14 are block diagrams depicting a stochastic model for simulation.

FIG. 8 depicts a simulator 34 having a stream manager 800 (e.g., one or more computer modules or routines, etc.) for managing various streams and/or substreams of random numbers that are generated by the random number generator 240 for use with the design points 700. In this example, the design points 700 include a first design point 710, a second design point 712, and additional design point(s) 714. Multiple replicates (720, 722, and 724) are associated with the first design point 710. The other design points also have one or more replicates associated with them.

Figure 9A:
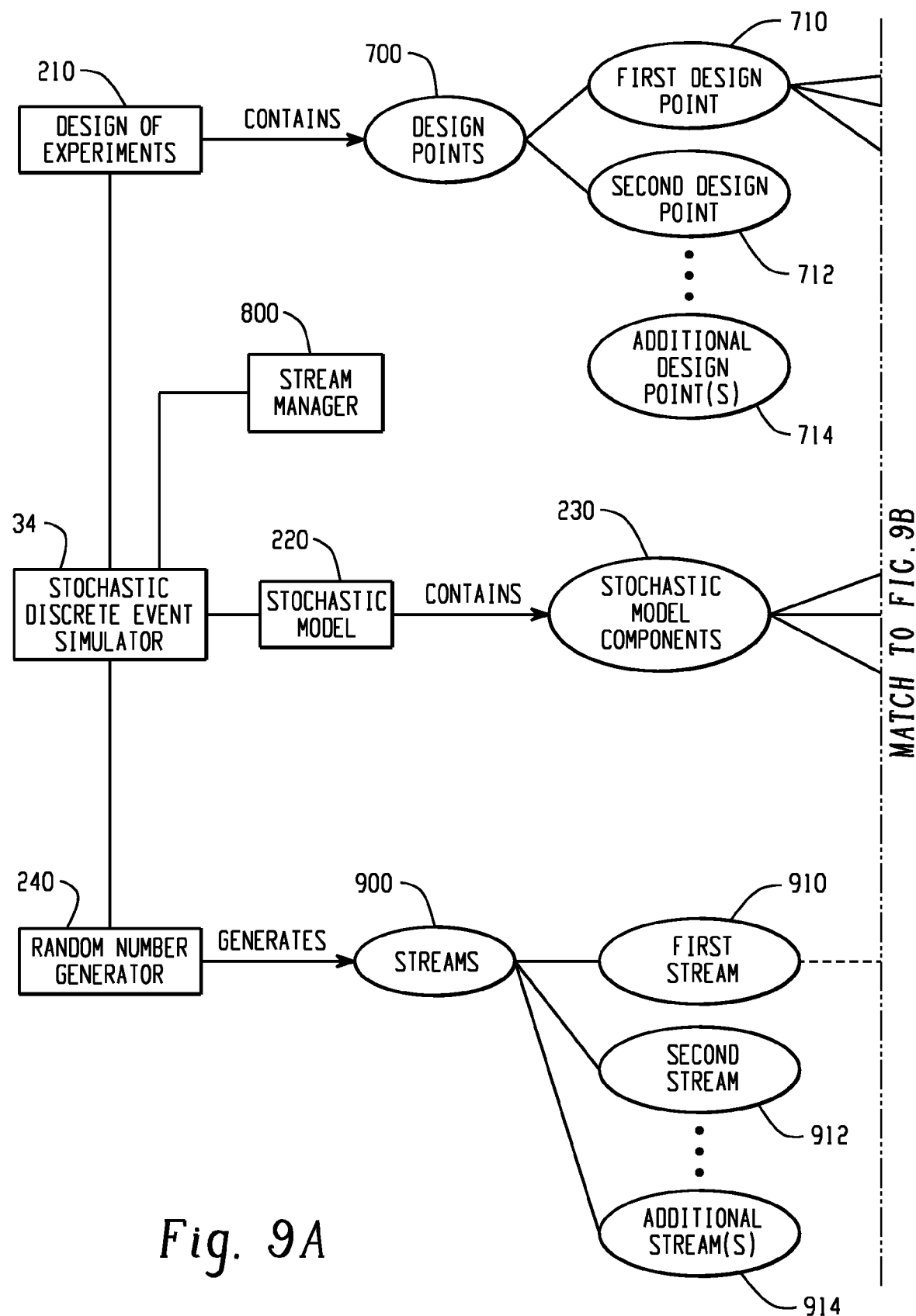
Figure 9B:
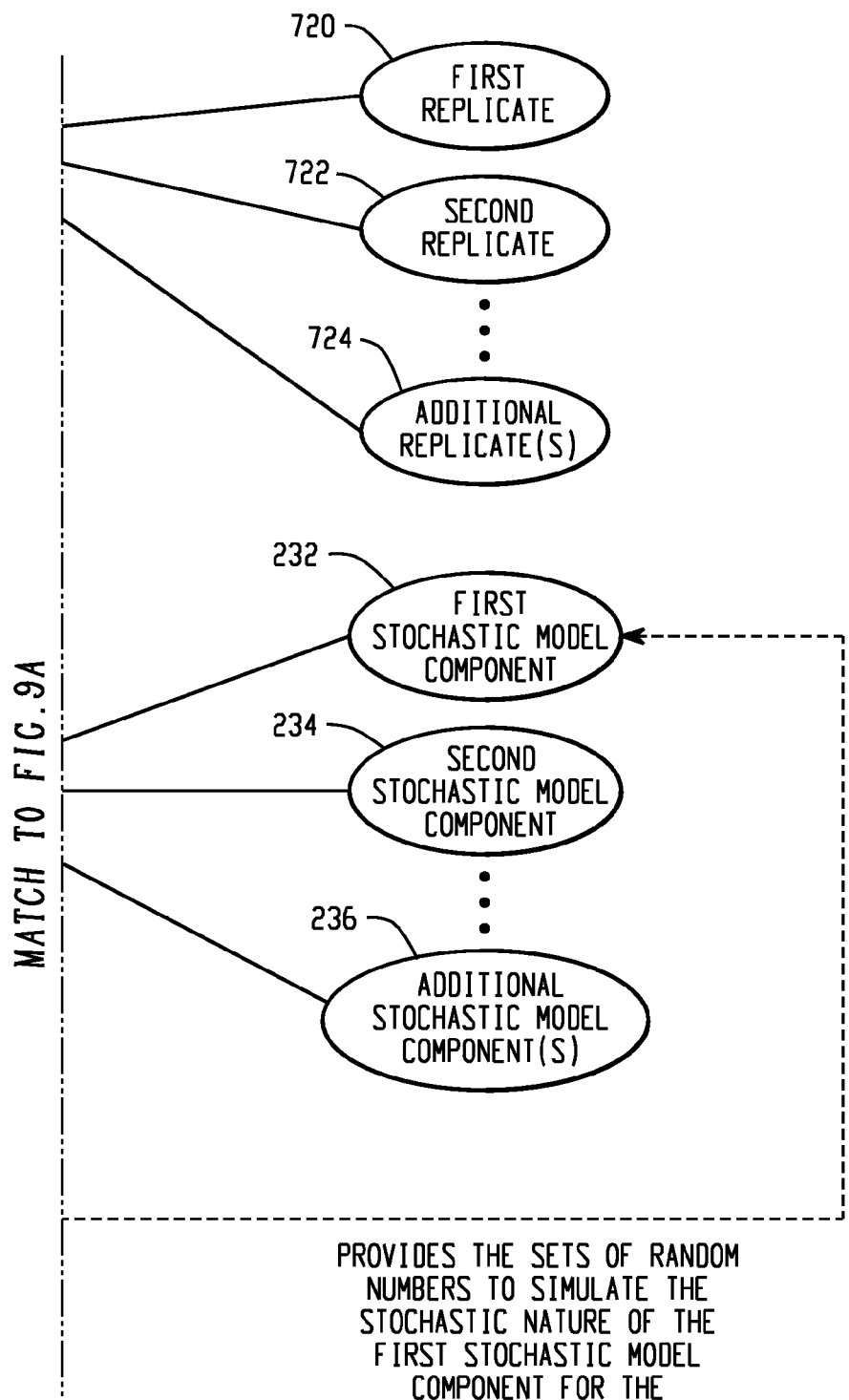

FIG. 9 depicts that the streams 900 (e.g., first stream 910, second stream 912, and additional stream(s) 914) generated by the random number generator 240 are associated with the stochastic model components 230. For example, the first stream 910 provides the sets of random numbers to simulate the stochastic nature of the first stochastic model component 232 for the replicates of the various design points.

Figure 10A:
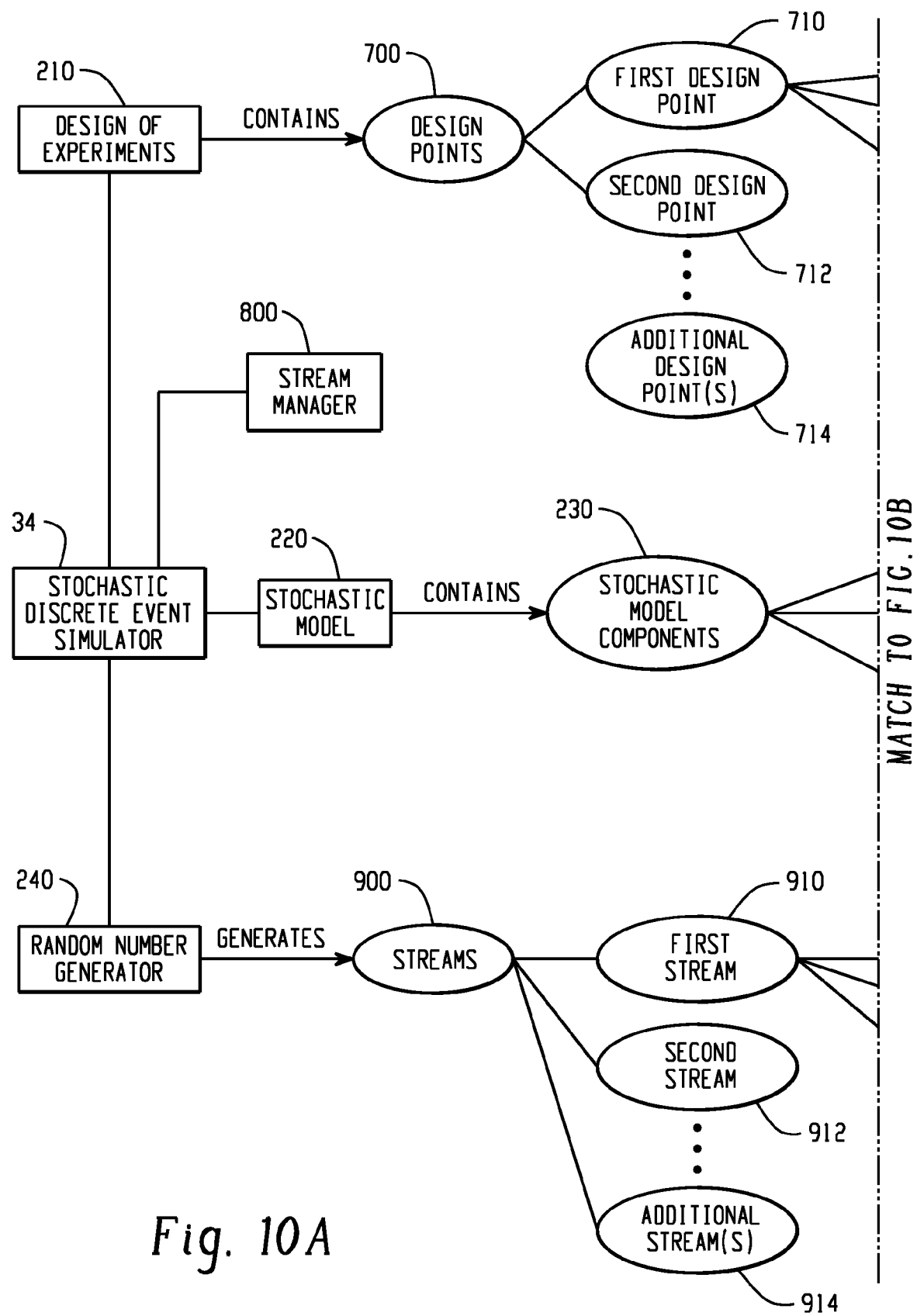
Figure 10B:
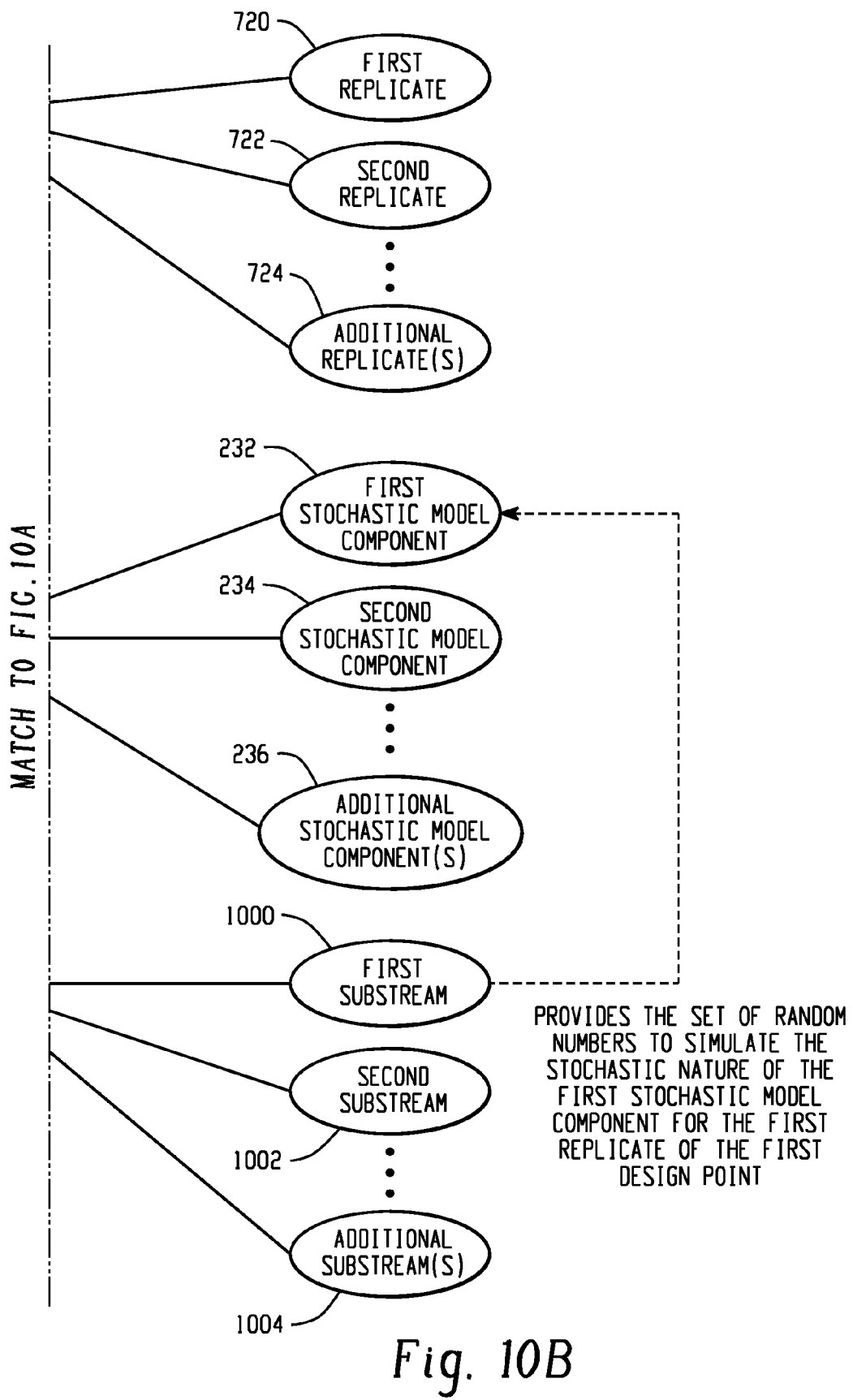

FIG. 10 depicts that the substreams (e.g. first substream 1000, second substream 1002, and additional substream(s) 1004) are associated with individual stochastic model components and replications. For example, the first substream 1000 provides a set of random numbers to simulate the stochastic nature of the first stochastic model component 232 for the first replicate 720 of the first design point 710.

Figure 11A:
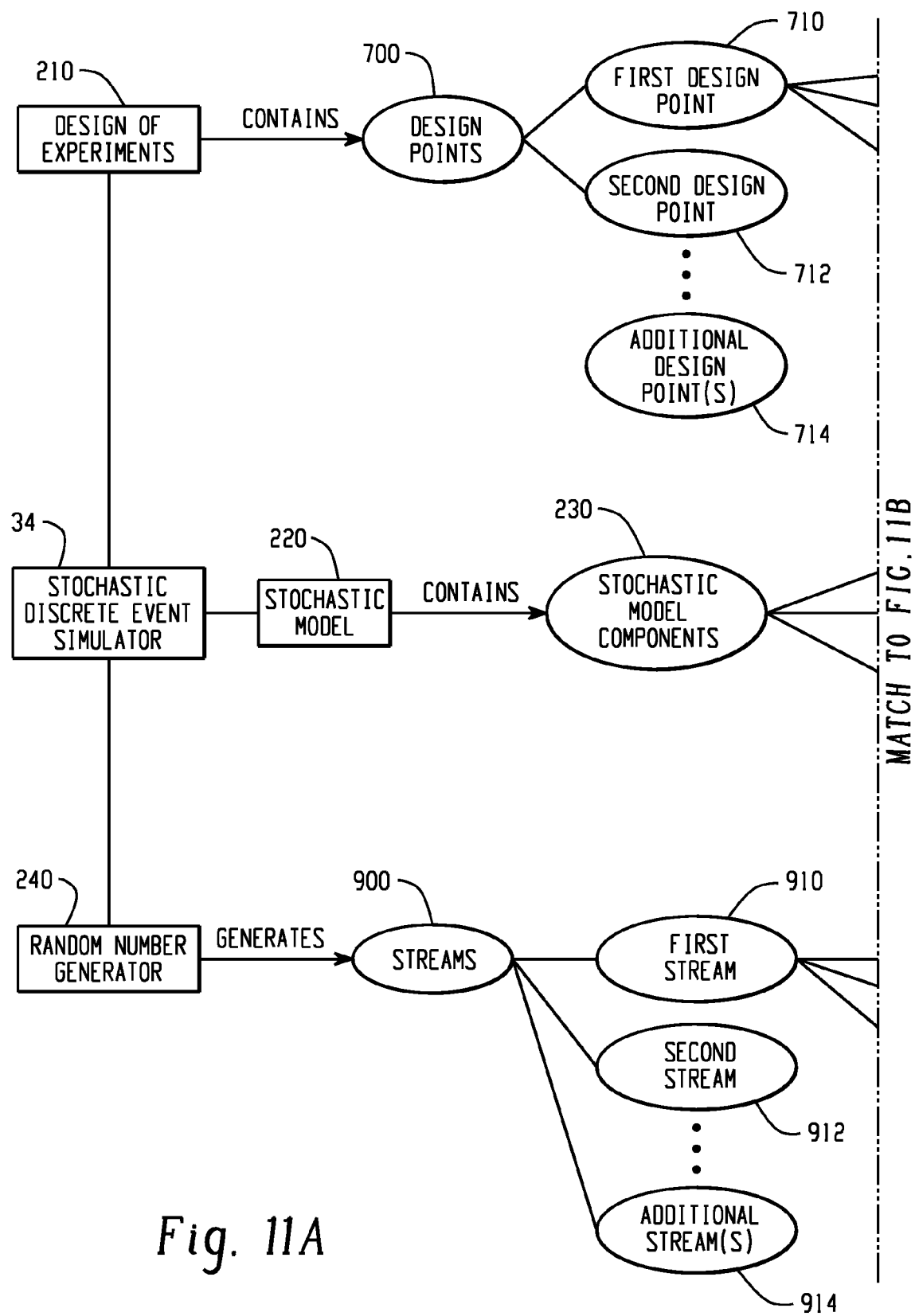
Figure 11B:
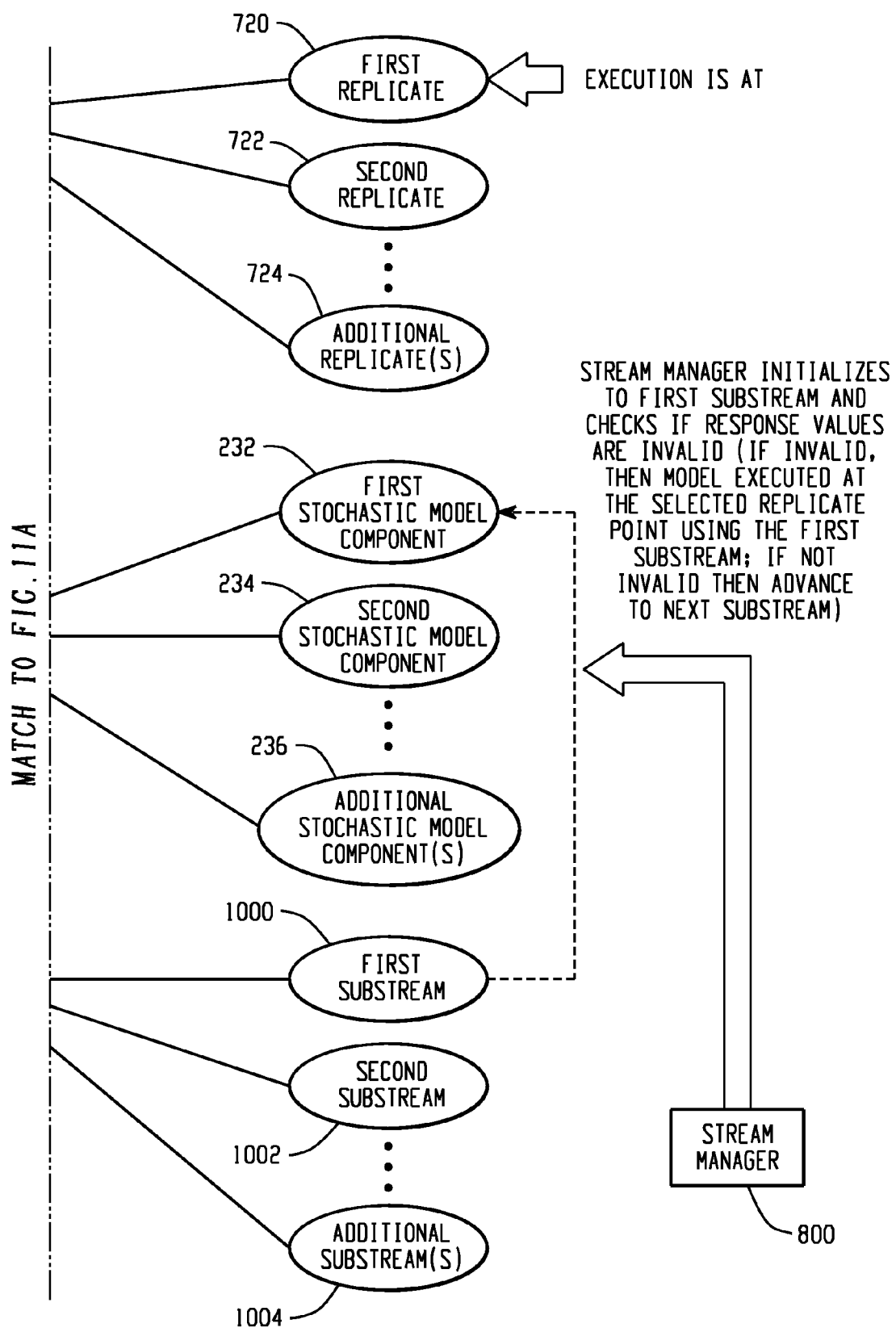

FIG. 11 depicts that the stream manager 800 manages the substreams during execution of the stochastic model 220. The stream manager 800 steps through the experimental design one design point at a time, replicate by replicate. Each time a new design point is encountered, the random number generator 240 is reset to the beginning of each stream (at its first substream). For each replicate in a design point the stochastic components in the model are initialized with the appropriate substream information and the substreams are advanced. If the response values are invalid for that replication, the model is executed and the results recorded; else execution proceeds to the next replicate or design point in order for the process to be repeated. This scheme allows for reproducibility of results and eliminates the need to rerun previously executed replicates, thereby providing the simulation user with a powerful, efficient, and reliable simulation environment.

For example, when execution is at the first replicate 720 for the first design point 710, the stream manager 800 initializes the streams for each stochastic component and checks if response values are invalid. If response values are invalid, then the model is executed at the selected replicate point (i.e., first replicate 720) using the first substreams for each stream (e.g., substream 1000). However if the response values are not invalid, then the stream manager 800 advances to the next substream (i.e., the second substream (e.g., substream 1002) for each stream).

Figure 12A:
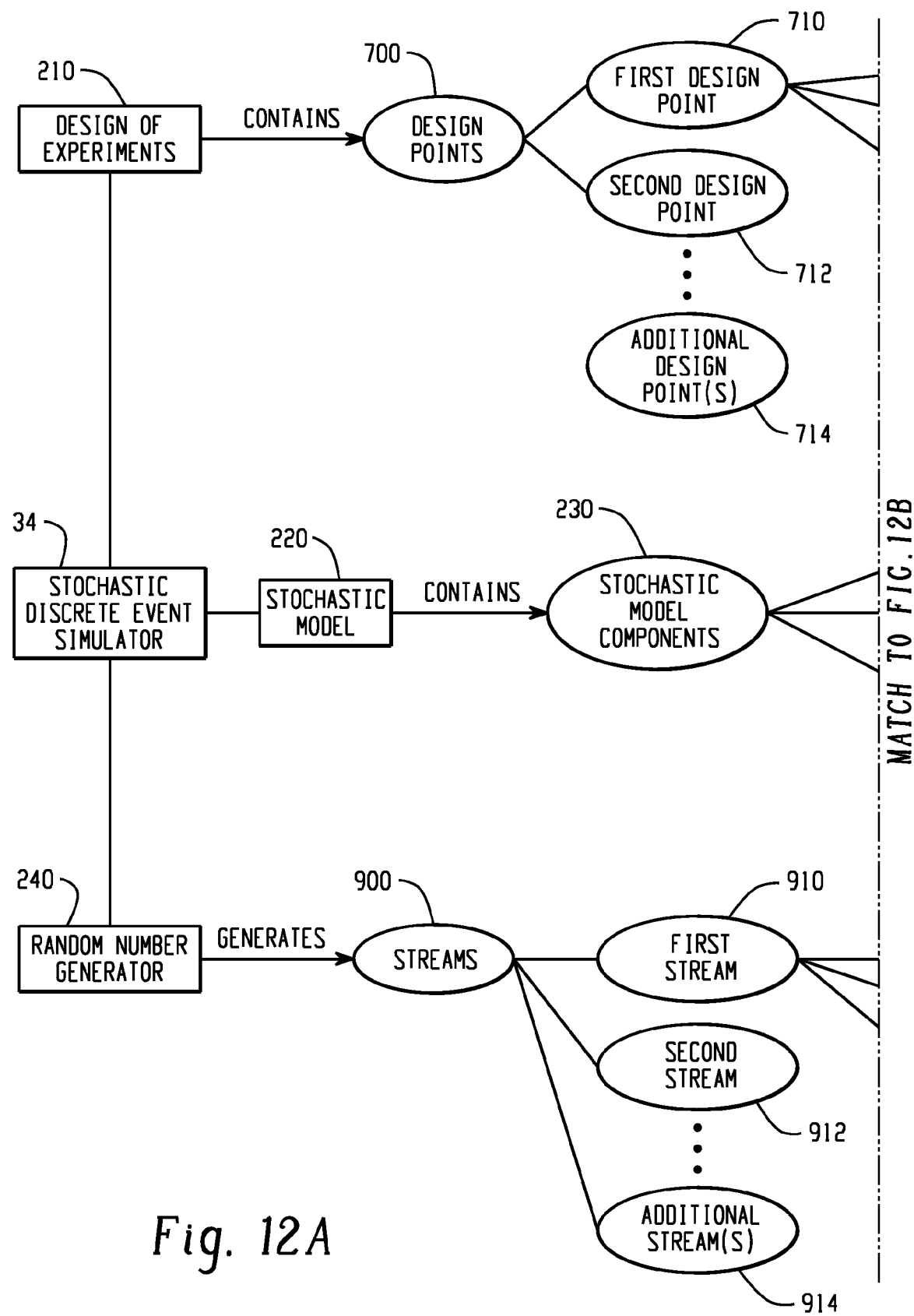
Figure 12B:
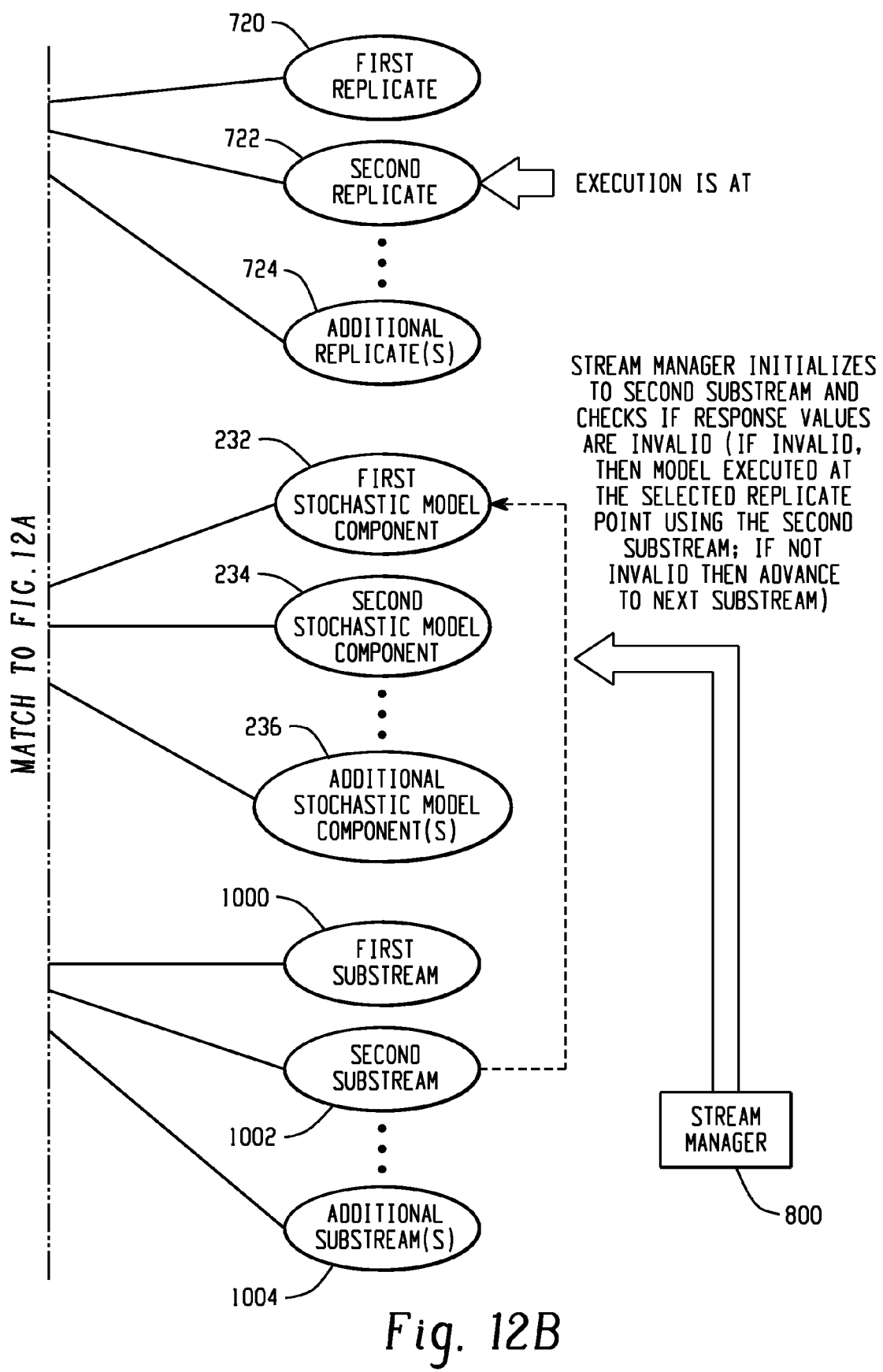

FIG. 12 depicts that when execution is at the second replicate 722, the stream manager 800 initializes each stream to the second substream and checks if response values are invalid. If the response values are invalid, then the model is executed at the selected replicate point using the second substreams of each stream. However if they are not invalid, then the stream manager 800 advances to the next substream.

Figure 13A:
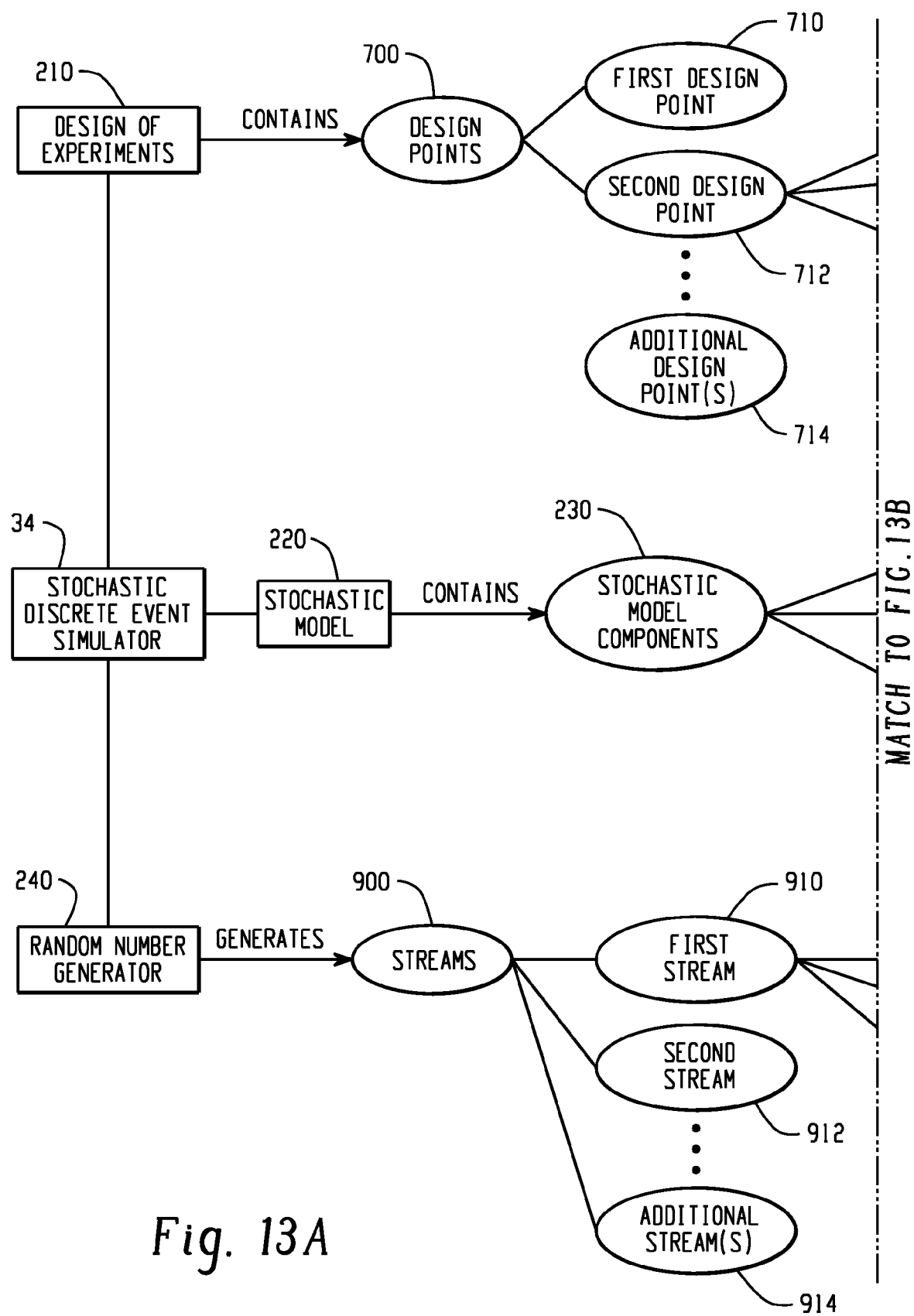
Figure 13B:
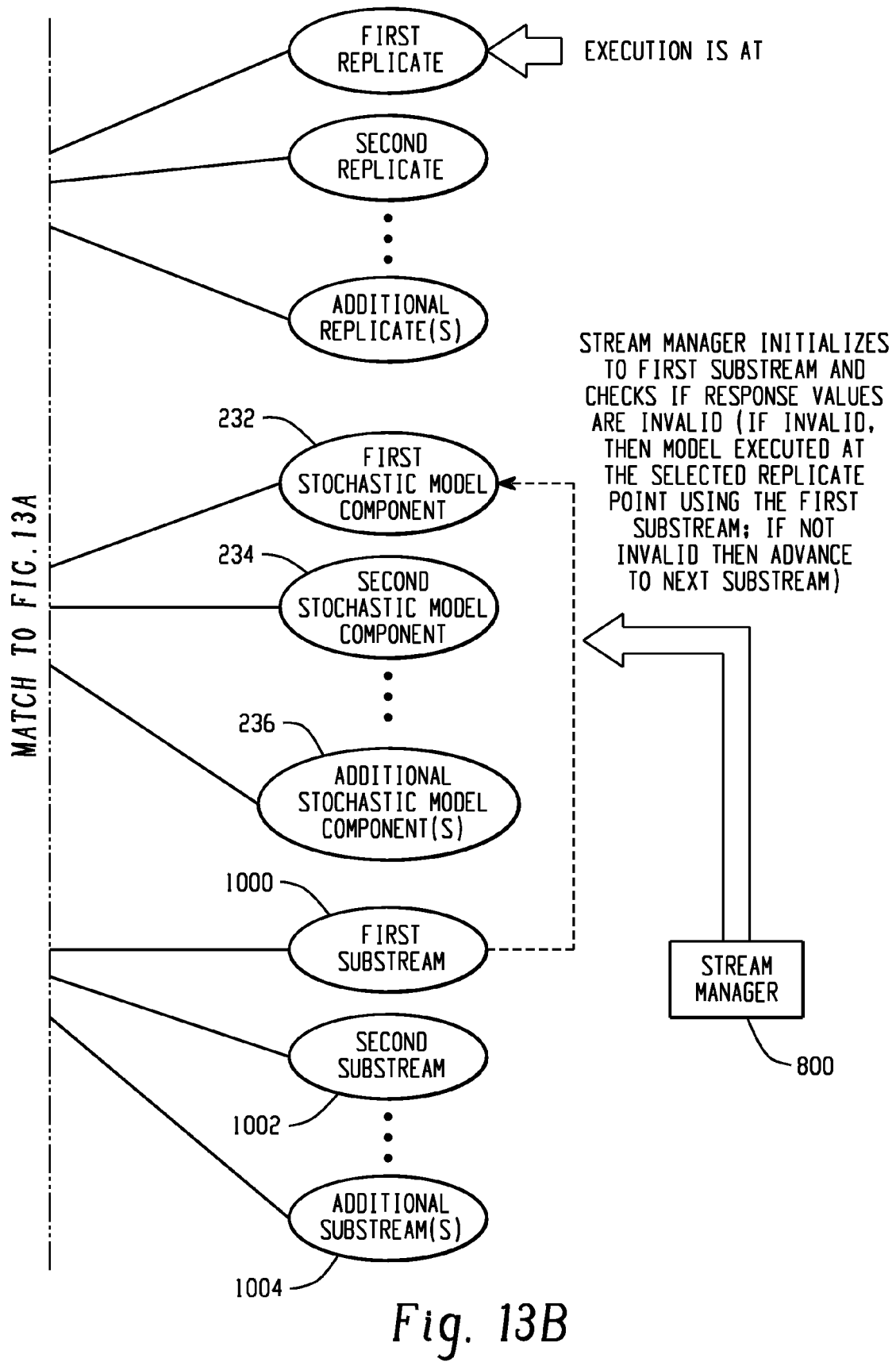

FIG. 13 depicts that when execution is at the first replicate for the second design point 712, the stream manager 800 initializes all streams to their first substream and checks if response values are invalid. If they are invalid, then the model is executed at the selected replicate point using the first substream of each stream. However if they are not invalid, then the stream manager 800 advances to the next substream.

Figure 14A:
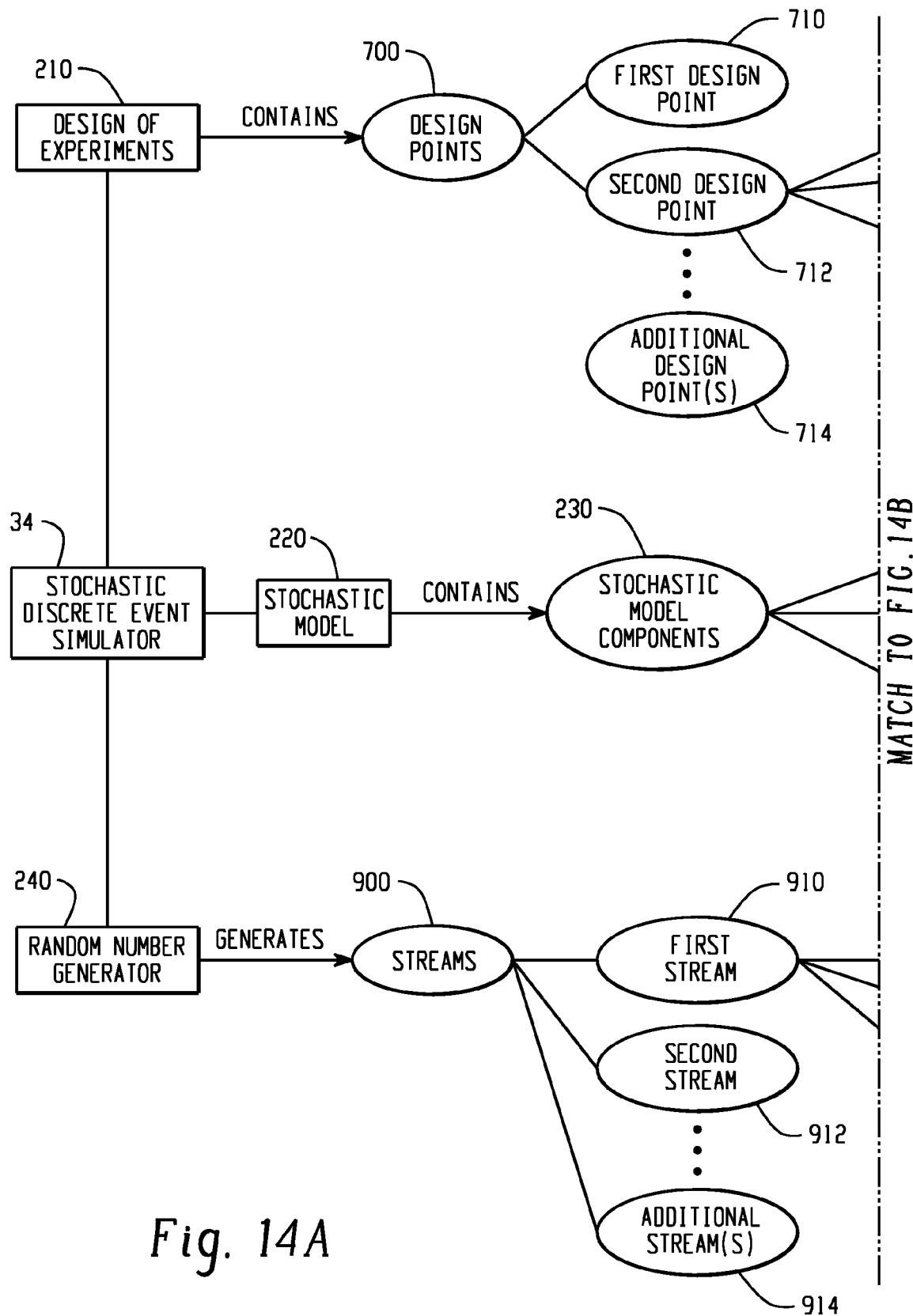
Figure 14B:
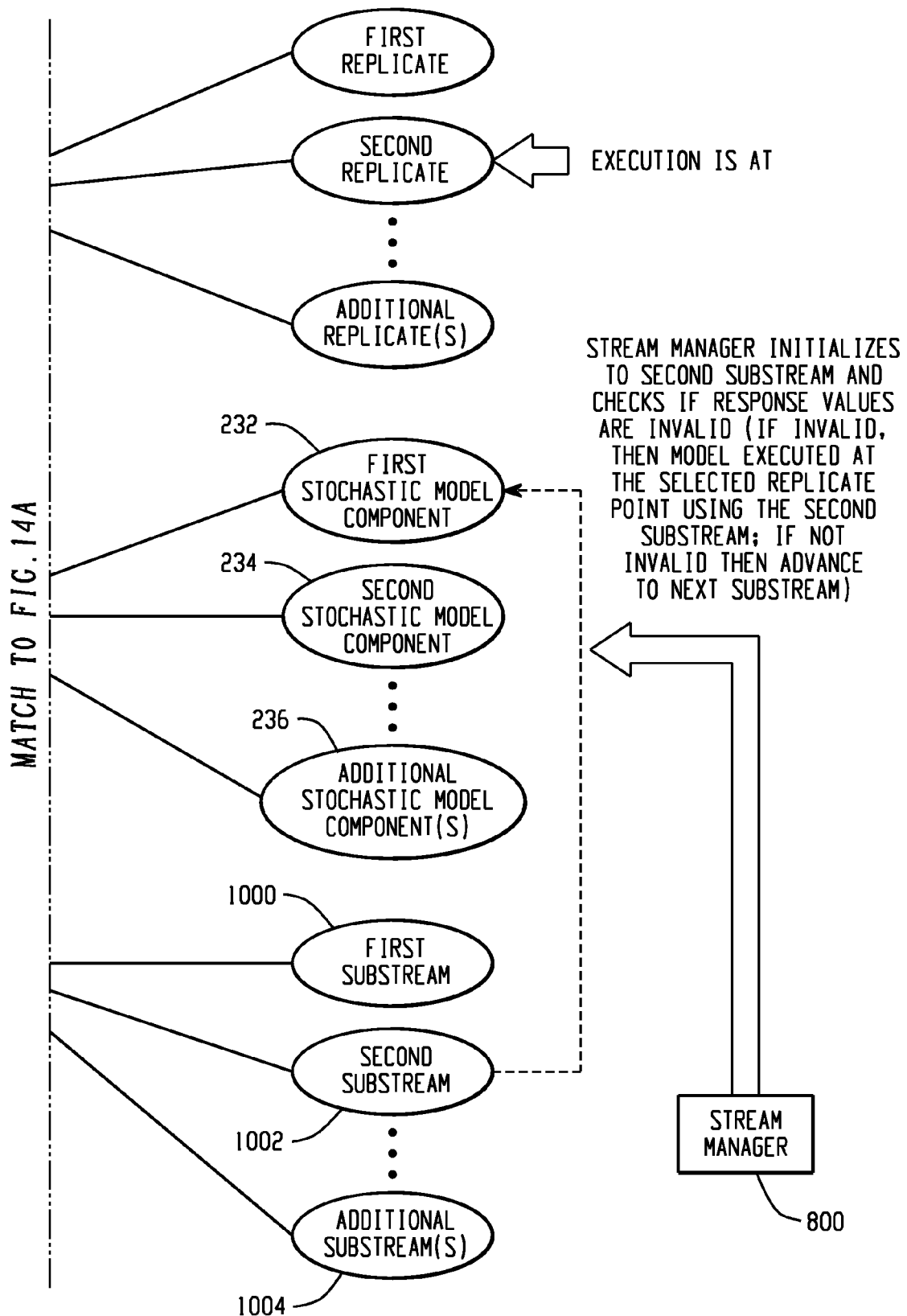

FIG. 14 depicts that when execution is at the second replicate of the second design point 712, the stream manager 800 initializes all streams to their second substream and checks if response values are invalid. If they are invalid, then the model is executed at the selected replicate point using the second substream for each stream. However if they are not invalid, then the stream manager 800 advances to the next substream.

Figure 15:
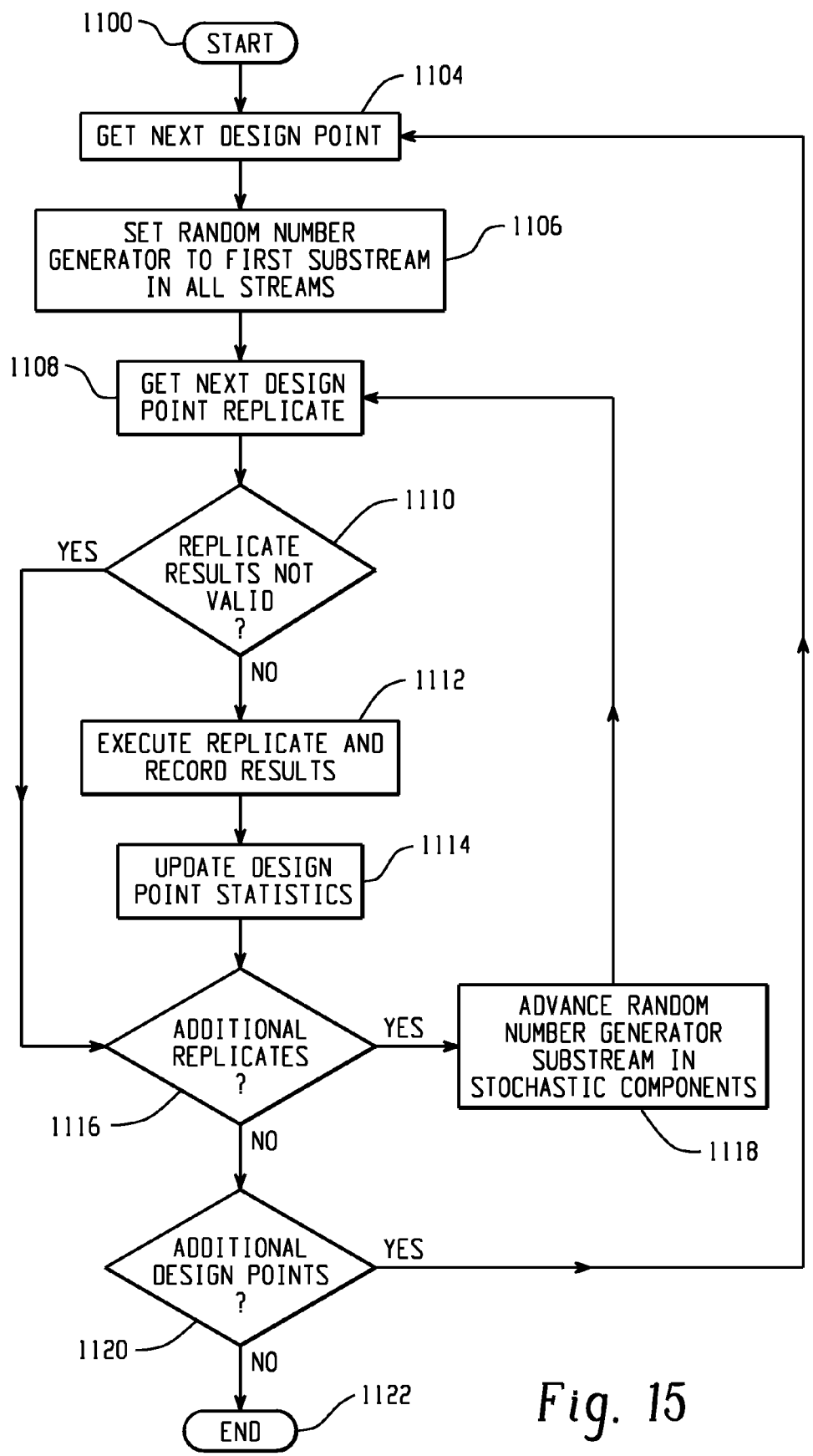
FIG. 15 is a flowchart of an operational scenario for execution of a stochastic model.

FIG. 15 provides another illustration of an operational scenario for handling streams and substreams when executing a simulation for one source of randomness in the model. In this operational scenario, the simulator identifies the new replicates that need to be executed and also assigns the appropriate substreams to the probability distributions in the model components when executing the individual runs.

As depicted by start indicator 1100, processing for this operational scenario begins at step 1104 which provides for the traversing of the entire experiment one design point at a time, starting at the first replicate of the first design point as indicated by step 1108. Stepping through the experimental design, the random number generator is reset at step 1106 to the beginning of each stream (the first substream) in all streams. For each replicate within a given design point, the algorithm advances the substream for each assigned stream. That is, for each replicate in a design point, the stochastic components in the model are initialized with the appropriate substream information and the substreams are advanced.

If response values are invalid for the design point replicate as determined at decision step 1110, the replicate is executed and the response values are recorded at step 1112. Step 1114 updates the design point statistics. If response values are not invalid for the design point replicate as determined at decision step 1110, processing progresses to the next replicate (or design point) and repeats the process if there are additional replicates as determined at decision step 1120. Before the process is repeated at step 1104, step 1118 advances the random number generator substream in the stochastic component.

In this operational scenario, the process of resetting the random number generator to the beginning of the stream for each design point, combined with advancing the substreams after each replicate (whether or not the replicate is actually executed or not) allows the experimental results to be consistent and reproducible. This approach not only provides a solution for an augmented experimental design, (e.g., where an incremental change to the design has been made) but also can be applied to the situation where the entire experimental design needs to be re-run. Also it should be understood that similar to the other processing flows described herein, the steps and the order of the steps in the flowchart of FIG. 15 may be altered, modified, removed and/or augmented and still achieve the desired outcome. A multiprocessing or multitasking environment could also allow two or more steps to be executed concurrently.

Figure 16:
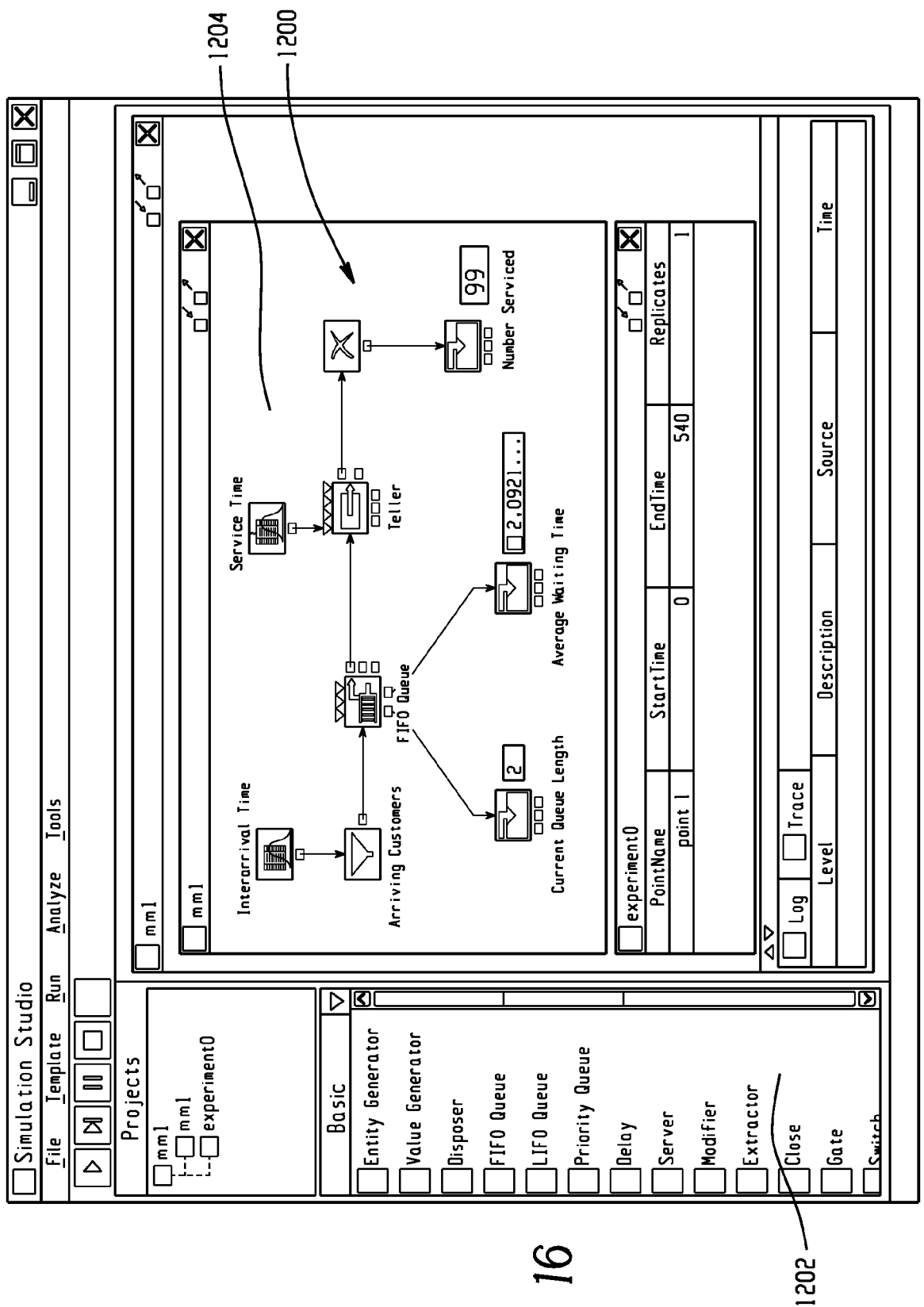
FIG. 16 is a screen shot of construction of a model.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration of the wide scope of the systems and methods, FIGS. 16 and 17 are screen shots depicting another example of handling stochastic model simulations. In FIG. 16, construction of a model 1200 is accomplished by dragging block icons from a template 1202 and dropping them into a Model window 1204 and connecting the block icons with arcs created by drag-and-drop. Note that in this modeling environment there are two types of input and output ports attached to the blocks. Ports, on the right and left sides of blocks, are used to pass entities between blocks via arcs. Ports, on the top and bottom sides of the blocks, are used to pass information between blocks, again via arcs. Examples of information flows in this example model include the service time for a Server block, the time between entity arrivals for an Entity Generator block, and performance metrics (length of queue, wait time) from a Queue block. Once the model is built, a user can run it by using the controls on the toolbar at the top of the window.

In order to run a model, a user clicks the Start button (leftmost button, with the "Play" icon). For debugging purposes a user might want to click the Animate button (rightmost button, with the movie camera icon) first to show the flow of entities and information through the model. The run of the model can be paused at any time by clicking the Pause button (third button from the left). A user stops and resets the model run by clicking the Reset button (second button from the right, with the "Stop" icon). These controls are also available via the Run pull-down menu, along with controls that enable the user to view the simulation clock and the count of replications run for the model.

FIG. 17 shows at 1300 an experiment window for a repair shop simulation model. There are three factors (shown at 1310, 1312, and 1314) which denote staffing levels (number of servers) at the Quality Control, Repair, and Service locations. There are seven responses (shown at 1320, 1322, 1324, 1326, 1328, 1330, and 1332): number of units fixed and, for each of Quality Control, Repair, and Service locations, metrics on the average wait and the average utilization of the servers. In this design, five replications are specified for each design point. Design point number 4 has been expanded to show the results for each of its five replications. The remaining rows display response figures that represent the mean of the results from their five replications.

For any design, a user can run the replications associated with design points by highlighting the desired rows in the experiment window 1300 and clicking the Start button on the toolbar. If a user chooses to run the entire design, then the user should highlight all of the rows. A user will see each selected design point's row highlighted with red text in turn as they are run; in the highlighted row the response column values are refreshed as each replication is run. After the run has completed, a user can click the arrow in the Replicates column to expand the design point and make each replication visible.

As another example of the wide scope of the systems and methods described herein, the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for executing stochastic simulations, comprising:
   receiving, using one or more data processors, a number of design points for a stochastic model to be simulated, wherein each design point varies one or more parameters of the stochastic model, wherein the stochastic model includes a plurality of stochastic model components, and wherein a stochastic model component uses a stream of numbers as an input;
   receiving, using the one or more data processors, a number of replicates to be performed for each design point;
   associating, using the one or more data processors, a random number stream with each stochastic model component;
   associating, using the one or more data processors, a substream of the random number stream with each of the replicates;
   executing, using the one or more data processors, the number of replicates for each design point, wherein each execution is associated with a replicate number, wherein a stochastic model component receives an associated substream based upon the replicate number, and wherein a particular substream is received by a particular stochastic model component for a particular replicate number of multiple design points;
   determining, using the one or more data processors, a design point-replicate metric for each replicate of each design point by monitoring performance of the executions;
   storing the design point-replicate metrics;
   receiving additional design points or additional replicates to be executed; and
   reexecuting the number of replicates for each design point, wherein when a prior design point-replicate metric has been previously stored for a particular design point-replicate, that design point-replicate is skipped during reexecuting.

2. The method of claim 1, wherein a random number generator is reset and the plurality of stochastic model components are reinitialized when a new design point is reached.

3. The method of claim 1, wherein the stochastic model components are representative of components from a real world system.

4. The method of claim 3, wherein the real-world system is a medical system, a construction system, a power consumption system, an automotive assembly plant system, or a bank transaction system.

5. The method of claim 3, wherein the design point-replicate metrics identify one or more statistically valid inferences corresponding to the real world system.

6. The method of claim 1, wherein the stochastic simulations are performed based upon a design of experiments framework.

7. The method of claim 6, wherein the design of experiments framework includes one or more design point parameters corresponding to one or more factors, and one or more design point-replicate metrics corresponding to one or more responses.

8. The method of claim 1, wherein the stochastic model components use pseudo-random numbers to generate samples from a probability distribution.

9. The method of claim 8, wherein the pseudo-random numbers are samples from a uniform distribution on an interval [0,1].

10. The method of claim 8, wherein the probability distribution is an exponential distribution, a uniform distribution, a normal distribution, or a beta distribution.

11. The method of claim 1, wherein when two design points have identical parameters, the simulation of the two design points determines identical design point-replicate metrics for the two design points.

12. The method of claim 1, wherein executing the number of replicates for each design point further includes:
   executing a first replication of a first design point, wherein a first stochastic model component is provided random numbers from a first substream of a first stream, and wherein a second stochastic model component is provided random numbers from a first substream of a second stream;
   monitoring performance of the first replication of the first design point to determine a first replication, first design point metric;
   executing a second replication of a first design point, wherein the first stochastic model component is provided random numbers from a second substream of the first stream, and wherein the second stochastic model component is provided random numbers from a second substream of the second stream;
   monitoring performance of the second replication of the first design point to determine a second replication, first design point metric;
   executing a first replication of a second design point, wherein the second design point varies one or more parameters of the stochastic model, wherein the first stochastic model component is provided random numbers from the first substream of the first stream, and wherein the second stochastic model component is provided random numbers from the first substream of the second stream; and
   monitoring performance of the first replication of the second design point to determine a first replication, second design point metric.

13. A system for executing stochastic simulations, comprising:
   one or more data processors;
   one or more computer-readable storage mediums containing instructions configured to cause the one or more data processors to perform operations including:
   receiving a number of design points for a stochastic model to be simulated, wherein each design point varies one or more parameters of the stochastic model, wherein the stochastic model includes a plurality of stochastic model components, and wherein a stochastic model component uses a stream of numbers as an input;
   receiving a number of replicates to be performed for each design point;
   associating a random number stream with each stochastic model component;
   associating a substream of the random number stream with each of the replicates;
   executing the number of replicates for each design point, wherein each execution is associated with a replicate number, wherein a stochastic model component receives an associated substream based upon the replicate number, and wherein a particular substream is received by a particular stochastic model component for a particular replicate number of multiple design points;
   determining a design point-replicate metric for each replicate of each design point by monitoring performance of the executions;
   storing the design point-replicate metrics;
   receiving additional design points or additional replicates to be executed; and
   reexecuting the number of replicates for each design point, wherein when a prior design point-replicate metric has been previously stored for a particular design point-replicate, that design point-replicate is skipped during reexecuting.

14. A computer-program product for executing stochastic simulations, tangibly embodied in a non-transitory machine-readable storage medium, including instructions configured to cause a data processing apparatus to:
   receive a number of design points for a stochastic model to be simulated, wherein each design point varies one or more parameters of the stochastic model, wherein the stochastic model includes a plurality of stochastic model components, and wherein a stochastic model component uses a stream of numbers as an input;
   receive a number of replicates to be performed for each design point;
   associate a random number stream with each stochastic model component;
   associate a substream of the random number stream with each of the replicates;
   execute the number of replicates for each design point, wherein each execution is associated with a replicate number, wherein a stochastic model component receives an associated substream based upon the replicate number, and wherein a particular substream is received by a particular stochastic model component for a particular replicate number of multiple design points;
   determine a design point-replicate metric for each replicate of each design point by monitoring performance of the executions;
   store the design point-replicate metrics;
   receive additional design points or additional replicates to be executed; and
   reexecute the number of replicates for each design point, wherein when a prior design point-replicate metric has been previously stored for a particular design point-replicate, that design point-replicate is skipped during reexecuting.

15. A computer-implemented system for executing stochastic discrete event simulations for a stochastic model through a design of experiments approach, wherein streams of random numbers that are generated by a random number generator are associated with stochastic model components that are sources of random variation within the stochastic model, wherein a design of experiments is associated with a plurality of design points including a first design point, wherein the first design point is associated with a plurality of replicates that have an execution order, said system comprising:
   a non-transitory computer-readable data store for storing information about the streams including information about a first stream;
   wherein the first stream is associated with a first stochastic model component that is a source of random variation within the stochastic model;
   wherein the first stream has a plurality of substreams;

wherein each of the substreams of the first stream are associated with a particular replicate of the first design point;

stream managing software instructions configured to operate on a data processor for advancing to one or more different substreams based upon which of the replicates is to be used in the simulation of the stochastic model;

wherein a number of replicates are executed for each of a number of design points to generate stochastic discrete event simulations for the stochastic model, wherein the first stochastic model component receives a substream of the first stream based upon the replicate number, and wherein a particular substream is received by the first stochastic model component for a particular replicate number of multiple design points;

wherein said stream managing software instructions are configured to step through the design points one design point at a time and one replicate at a time; and wherein each time a new design point is encountered during said stepping through the design points, said stream managing software instructions:

resetting the random number generator and initializing the stochastic model components with respect to the substreams that are associated with a replicate in the new design point;

executing the stochastic model and storing execution results in a computer-readable data store if response values are invalid for a replicate in the new design point; and advancing to a different substream that is associated with the next replicate of the new design point if response values are not invalid for a replicate in the new design point.

* * * * *